Sept. 20, 1932.   B. SILBERMANN   1,878,194
SAFETY DEVICE FOR MOTOR CARS
Filed May 28, 1927
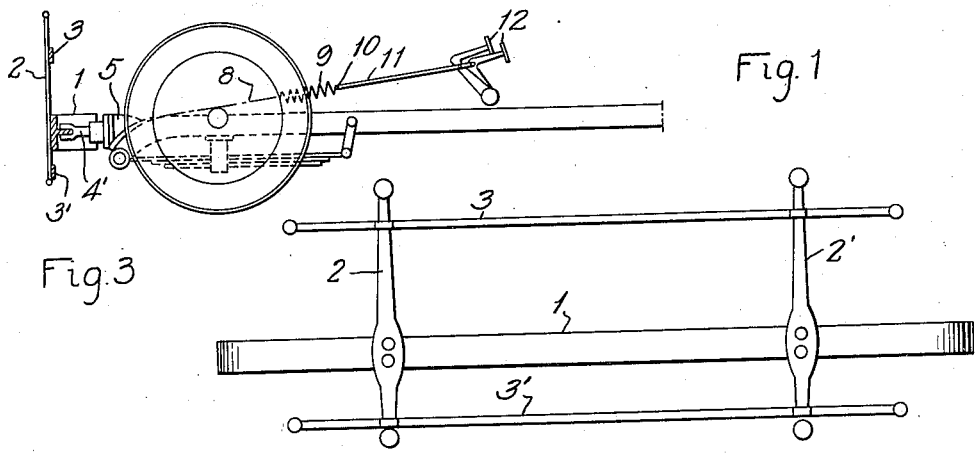
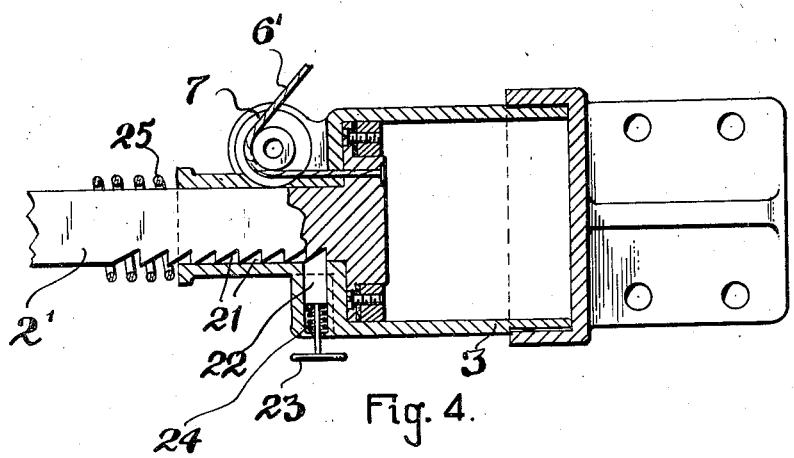
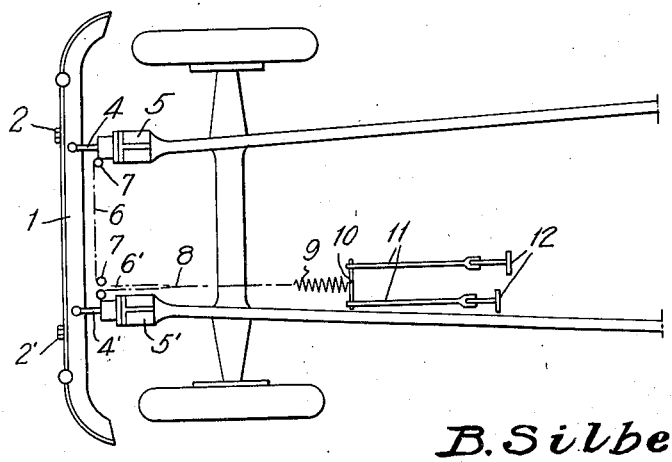
INVENTOR.
B. Silbermann,
BY
Marks Clark
ATTORNEYS.

Patented Sept. 20, 1932

1,878,194

UNITED STATES PATENT OFFICE

BORIS SILBERMANN, OF LAUSANNE, SWITZERLAND

SAFETY DEVICE FOR MOTOR CARS

Application filed May 28, 1927. Serial No. 195,124.

There are already shock-absorbing devices for motor-cars enabling them to be stopped automatically by the putting on of the brake in case of collisions, and designed to protect the car against material damages. The mechanism of these shock-absorbers are generally very complicated and expensive.

The object of the present invention is to suppress these disadvantages by means of a device enabling the brake to be automatically put on, this device being very simple and easily adaptable to any motor car; on the other hand, this invention has for its purpose to provide a safety catcher which, in case of a collision between the car and a pedestrian throws him forward, enabling thus the mechanism to control automatically the brake in order to stop the car before is wheels reach the fallen pedestrian; it is well known that the majority of mortal cases occuring in such collisions are caused, not by the shock, but chiefly by the running over of the fallen pedestrian by the wheels of the car.

In order that the invention may be fully understood and readily carried out, one form of the shock-absorber according to the invention is described hereinafter, by way of example, and illustrated in the accompanying drawing.

Figures 1, 2 and 3 of the drawing herewith show, by way of example, a form of embodiment of the object of the invention.

Figure 1 is a schematic side view with a fragmentary section of the safety catcher, Figure 2 is a plan view, Figure 3 is a front view of the safety catcher on a larger scale.

Figure 4 is a longitudinal sectional detail of the shock-absorbing means.

The safety catcher is constituted by a strong transverse bar 1, acting as a buffer, and comprising two uprights 2, 2', connected by the upper and lower cross-bars 3, 3', mounted parallel to the bar 1; this last is articulated on the end of each of two axles 4, 4' whose other ends slide axially in the interior of two supports 5, 5' fixed on the front part of the frame of the car. The spacing between the bars 3 and 3' is sufficiently large in order that the lower cross-bar 3' knocks against a foot-passenger below his knees, while the upper cross-bar 3 knocks him at the height of his breast. Thus, the pedestrian is thrown forward to some distance from the car.

Each of the axles 4, 4' is connected with the end of two cables 6, 6', guided on the rollers 7, and whose other ends are joined together with a cable 8 which is connected at its other end with an extensible spring 9. This spring 9 is fixed on the middle part of a pole 10 designed to balance the tractions of the connecting means 11 which connect this pole with the pedal levers controlling the brake and the clutch of the motor of the car.

Moreover, the apparatus is provided with a safety locking device (Fig. 4) securing firmly the apparatus in its working position. This safety locking device is disposed on each of the axles 4 and 4'.

The piston rods 4 4' have notches 21 which are adapted to receive the end of a pawl 22 provided with a control button 23 the said pawl 22 being movable or displaceable in the interior of a cavity formed in the wall of each shock absorber. The pawl 22 is constantly pushed back in a notch 21 by means of a spring 24 so that the piston is adapted to be displaced in the direction of the compression but is immobilized in the direction of the decompression by the pawl 22 engaging in one of the notches 21; the pawl 22 may be operated by the control button 23 so as to permit the piston to be brought back to its position of decompression.

In order to enable the pistons 4 4' to reassume automatically their position of decompression, they are each provided with a spring 25 which being supported on the one hand on the absorber and on the other hand on the piston connected to the bumper forms a shock absorber which tends constantly to push back the said piston into its position of decompression.

The apparatus operates in the following manner: the catcher 1 on striking an obstacle moves back causing the piston rods 4 4' to move into the interior of cylinders 5 5' producing therein the compression of the air and thus effecting a progressive absorption of the shock; during their displacement, the piston rods 4 4' entrain the cables 6 6' and 8, the latter exerting tractive force on the spring 9, under the effect of the sudden tractive force, the spring 9 stretches instantaneously and thus plays the rôle of absorber between the cable 8 and the cross bar 10 which entrains the cables 11 and 12 actuating the pedals 12; the displacement of the latter results in disconnecting and braking the vehicle.

Simultaneously with the operation above described and when the pistons 4 4' have been compressed the pawl 22 of each shock absorber has entered under the action of the spring 24 one of the notches 21 so that at the end of the stroke of the pistons 4 4' the latter remain immobilized in their position; in this manner the whole of the members actuating the pedals 12 remains immobilized, thereby keeping the vehicle disconnected and braked.

The decompression of the pistons 4 4' is effected by releasing the pawl 22 either by means of the control button 23 or from the interior of the vehicle if the pawl 22 is controlled at a distance; at this moment, the springs 25 compressed by the shock are relaxed and the shock absorber 1 automatically assumes its position of rest, thus again permitting the free use of the pedals 12.

From the effect of the shock, the safety catcher, owing to its cross-bars 3 and 3', throws the foot-passenger forward, while simultaneously the catcher recedes by the effect of the shock and exerts a traction on the cables 6, 6', the spring 9, the pole 10, the cables 11 and finally on the pedal-levers 12 which control the brake and the clutch-out of the motor of the car, in such a way as to stop the car before its wheels reach the fallen pedestrian.

It is well understood that the construction of the whole device can take another form than that which is described above; for instance, the cross-bars 3, 3' of safety catcher can be constituted by flexible sheets, or the cross-bars can be connected elastically with the uprights 2 and 2' or with the buffer-bar.

Having now particularly described and ascertained the nature of my said invention and in what manner the same is to be performed, I declare that what I claim is:—

Apparatus of the character described comprising in combination a vehicle frame including forwardly extending side bars, brake and clutch pedals on the frame, a catcher device disposed vertically in front of the frame including a main transversely extending bumper bar having a longitudinal flange portion extending laterally from the rear face, vertical resilient uprights on the front face and adjacent the ends of the main bumper bar, upper and lower resilient cross bars connected to the lower ends of the uprights, horizontally disposed cylinders extending longitudinally from the front ends of the side bars of the frame and rigid therewith, pistons operating in the cylinders, rods extending only from the front faces of the pistons and having their opposite ends bifurcated and fastened about the flanged portion of the main bumper bar, rollers mounted on the forward ends of the cylinders, cables connected to the connecting rods and trained about the rollers and joined to each other, a pole, an extensible spring between the pole and the joined cables, other cables between the pole and the brake and clutch pedals, and means associated with the connecting rods for releasably holding the pedals in brake applying position.

In testimony whereof, I have signed my name to this specification.

BORIS SILBERMANN.